No. 767,763. PATENTED AUG. 16, 1904.
O. REINVALDT.
GASKET.
APPLICATION FILED MAR. 21, 1904.
NO MODEL.

WITNESSES
William M. Swan
May E. Kott

INVENTOR
Otto Reinvaldt
By Parker & Burton
Attorneys.

No. 767,763.

Patented August 16, 1904.

UNITED STATES PATENT OFFICE.

OTTO REINVALDT, OF DETROIT, MICHIGAN.

GASKET.

SPECIFICATION forming part of Letters Patent No. 767,763, dated August 16, 1904.

Application filed March 21, 1904. Serial No. 199,313. (No model.)

*To all whom it may concern:*

Be it known that I, OTTO REINVALDT, a citizen of the United States, residing at Detroit, county of Wayne, State of Michigan, have invented a certain new and useful Improvement in Gaskets; and I declare the following to be a full, clear, and exact description of the invention, such as will enable others skilled in the art to which it pertains to make and use the same, reference being had to the accompanying drawings, which form a part of this specification.

My invention relates to metallic gaskets, and has for its object an improved soft-metal packing or gasket for flange-couplings; and to this end it consists in the combinations and appliances hereinafter set forth.

Figure 1:
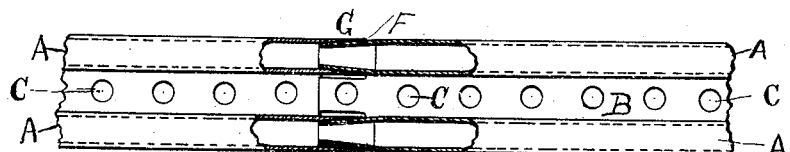
Figure 2:
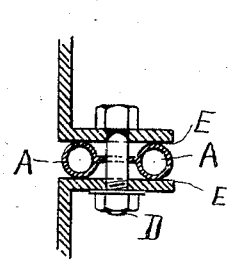
Figure 3:
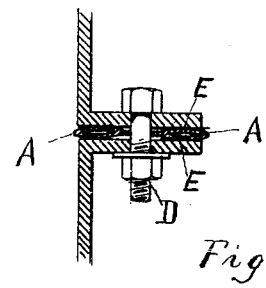
Figure 4:
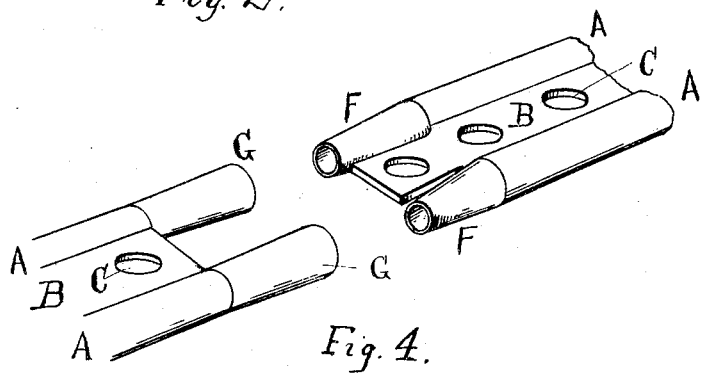

In the accompanying drawings, Figure 1 shows the relation of the annular gasket parts and the uniting-web, also one method of joining the ends. Fig. 2 is a cross-section showing the relation of the opposing flanges, the gasket, and the compressing-bolt. Fig. 3 is a cross-section after the uniting-bolts have been tightened. Fig. 4 is an enlarged perspective of sections of the gasket, showing the perforations in the web and one mode of preparing ends for union.

Similar letters refer to similar parts.

The device embodying this invention consists, preferably, of two parallel lengths of pipe or tubing A, composed of tin or some equally-soft metal, between which is a connecting-web B, of the same material, all of said parts being cast in one piece. At desired intervals are punched holes C, through which the bolt D passes. The gasket having been cut to the proper length, it is placed flatwise between the opposing flanged faces E of the members to be united and whose line of union it is desired to make tight and impervious. The perforations in the web must be opposite corresponding holes previously punched in the flanged faces E. Bolts are inserted through these holes, and as the nuts are tightened the faces press harder and harder upon the pipes A, which gradually yield to the pressure and collapse or become flattened, as shown in Fig. 3. The opposite faces of each section of pipe which engage the flanges E are by the pressure forced so tightly thereupon that the yielding metal fills up all the minute irregularities of the harder surfaces E as effectually as though the gasket were made of rubber or cloth. Such a gasket being of metal is open to none of the objections as to lack of durability or liability of deterioration because of contact with the contents of the tank when in use, which are properly urged against gaskets of rubber or other vegetable products. The pressure upon the web-section B when the bolts are tightened causes the tin to flow into and fill up whatever space is left between the stem of the bolt and the walls of the holes C as a result of any discrepancy in size between the size of the stem of the bolt and that of the holes C. Whatever roughness at the joints still remains on the outer face—that is, the one opposite the direction of the flanges of the finished tank—may easily be made practically invisible by the use of a calking-tool.

These gaskets may be manufactured in the form of a closed ring in various sizes and diameters or they may be made in lengths and cut off as desired. When this latter method is resorted to, the ends are prepared for union and joined, as shown in Figs. 4 and 1, the entering ends F being swaged down somewhat and the receiving ends G enlarged, not only so that the one may enter the other, but also to avoid a lump and corresponding looseness of the joint when the pressure is applied because of the presence at that point of a greater mass of metal.

What I claim is—

1. A metallic gasket having in combination a plurality of parallel collapsible pipes united by an intervening web having suitable bolt-holes, with bolts adapted to compress said gasket between opposing flanging surfaces, substantially as described.

2. A metallic gasket having in combination a plurality of collapsible cylindrical members joined together by a perforated web with bolts adapted to compress said gasket between the flanged edges of the parts to be united, substantially as described.

3. A soft metallic gasket composed of a plurality of collapsible cylindrical members united by an intermediate web with suitable perforations, adapted to be compressed between the flanging edges of the parts to be united, substantially as described.

4. A soft metallic gasket composed of a central perforated web joining lateral parallel collapsible pipes, adapted to be inserted between the flanged edges of the parts to be united, together with means for compressing the same, substantially as described.

5. A metallic gasket, having in combination parallel collapsible cylindrical members joined by a perforated web, with means for compressing the same between the opposing flanged edges of the parts to be united, substantially as described.

6. A metallic gasket composed of parallel collapsible cylindrical members united by a central web with suitable perforations, substantially as described.

7. A metallic gasket composed of a plurality of collapsible cylindrical members connected by an intermediate web, substantially as described.

8. A metallic gasket having in combination a plurality of parallel collapsible pipes with a perforated uniting-web, substantially as described.

9. A soft metallic gasket composed of a plurality of parallel collapsible pipes joined by an intermediate web pierced with bolt-holes, adapted to be compressed between two flanging edges of harder material drawn together by the tightening of uniting-bolts, substantially as described.

10. A metallic gasket composed of a central uniting-web perforated with bolt-holes, along each side of which and integral therewith run collapsible cylindrical members, adapted to be compressed between the flanging edges of members of greater hardness by the tightening of bolts passing therethrough and through the opposing flanging parts, substantially as described.

In testimony whereof I sign this specification in the presence of two witnesses.

OTTO REINVALDT.

Witnesses:
CHARLES F. BURTON,
WILLIAM M. SWAN.